United States Patent [19]
Burns

[11] Patent Number: 6,009,451
[45] Date of Patent: *Dec. 28, 1999

[54] METHOD FOR GENERATING BARREL SHIFTER RESULT FLAGS DIRECTLY FROM INPUT DATA

[75] Inventor: Geoffrey Francis Burns, Macungie, Pa.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/754,430

[22] Filed: Nov. 22, 1996

[51] Int. Cl.$^6$ .................................................. G06F 7/00
[52] U.S. Cl. .......................... 708/525; 708/209; 708/531
[58] Field of Search .................... 364/715.04, 715.08, 364/736.5, 738, 745.03, 745.04, 748.04; 708/205, 209, 525, 530, 552, 553, 498

[56] References Cited

U.S. PATENT DOCUMENTS

| | | | |
|---|---|---|---|
| 4,393,468 | 7/1983 | New | 364/749 |
| 4,524,345 | 6/1985 | Sybel et al. | 340/146.2 |
| 4,955,024 | 9/1990 | Pfeiffer et al. | 371/40.11 |
| 5,375,080 | 12/1994 | Davies | 364/736.5 |
| 5,497,340 | 3/1996 | Uramoto et al. | 364/745.03 |
| 5,539,685 | 7/1996 | Otaguro | 364/757 |

*Primary Examiner*—Chuong D. Ngo

[57] ABSTRACT

A method and apparatus for generating a flag simultaneously with production of an operation result by an operational unit. The flag is generated based on data input to the operational unit, and the flag indicates the presence or absence of a condition in the operation result produced by the operational unit.

21 Claims, 11 Drawing Sheets

LOGICAL RIGHT SHIFT

LOGICAL LEFT SHIFT AND
ARITHMETIC LEFT SHIFT

ARITHMETIC RIGHT SHIFT

METHOD FOR GENERATING BARREL SHIFTER RESULT FLAGS DIRECTLY FROM INPUT DATA

FIELD OF INVENTION

The invention relates to the generation of flags in an operational unit, and in particular to a method and apparatus for generating flags concurrently with the production of an operation result in an operational unit.

BACKGROUND OF THE INVENTION

Arithmetic and logic operations in Digital Signal Processing and Processor hardware are typically performed in operational units between periods of a clock supplied to the hardware. Operational units typically receive input data at the beginning of a clock period, perform one or more operations, and have until the end of the clock period, or in other instances a multiple of a clock period, to produce an operation result. Examples of operations performed by operational units include arithmetic operations of multiplication, division, addition, and subtraction on an operand or operandi present in the input data to produce an operation result. Also, operational units may perform shifting operations on input data to normalize an operand, multiply or divide an operand by a power of two, or to logically manipulate bits contained in the input data. Flags may monitor a single bit or all of the bits of the operation result, and usually must be generated prior to the end of the clock period in which the operation result was produced. Because flags indicate conditions present in an operation result, logic for generating flags has been interposed between the operation result and the ultimate destination of the flag. However, waiting for the operation result prior to beginning to generate flag values stretches out the delay of operations which must be captured within one or more clock periods. This is particularly true when flag values depend on all bits of the operation result, therefore necessitating several stages of logic to produce a flag value. Generating flags after the operation result in a digital signal processor or a processor, may require extending the clock period, which is equivalent to reducing the clock frequency. Thus, performance and the speed of digital signal processor or processor as a whole may be adversely impacted by the necessity of accommodating long delays in operational units to generate flags.

SUMMARY OF THE INVENTION

A method and apparatus for generating a flag simultaneously with production of an operation result by an operational unit are disclosed. The flag is generated, based on data input to the operational unit, and indicates the presence or absence of a condition in the operation result produced by the operational unit. The method comprises producing mask data based on the instruction input to the operational unit; determining an anticipated operation result based on the mask data and the input data; and generating a flag based on the anticipated operation result.

In a preferred embodiment, the apparatus for generating a flag simultaneously with an operation result includes a decoder, a mask block, and a flag block. The decoder is connectable to a source of instructions and generates control signals based on the instructions. The mask block is coupled to the control signals of the decoder and generates mask data based on the control signals. The flag block is coupled to the mask data and includes an input connectable to a source of input data for the operational unit. The flag block generates a flag value based on the mask data and the input data. The flag value corresponds to a condition present in the operation result of the operational unit.

BRIEF DESCRIPTION OF THE DRAWINGS

These and other objects, features, and advantages will be more fully appreciated with reference to the accompanying drawings.

DETAILED DESCRIPTION OF THE PREFERRED EMBODIMENTS

Figure 1:
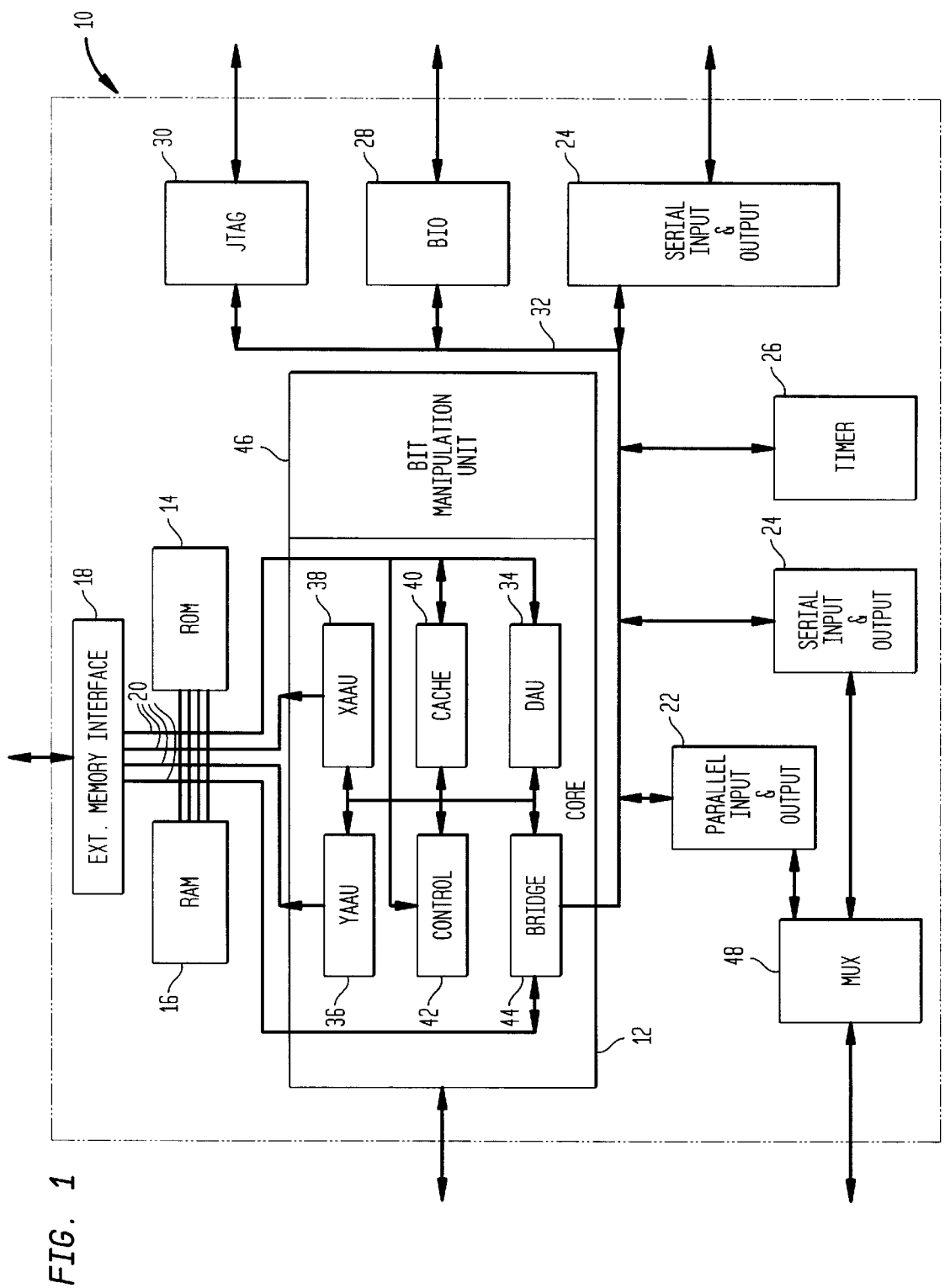
FIG. 1 depicts a block diagram of a digital signal processor in which the invention finds application.

FIG. 1 depicts a block diagram of a digital signal processor 10 in which the invention finds application. The block diagram is for the American Telephone and Telegraph (AT&T) DSP1610 and is described in AT&T Document Number MN90-020DMOS, copyright 1992, hereby incorporated by reference herein. The digital signal processor 10 executes program instructions to perform a wide variety of signal processing functions, including speech coding, modulation and demodulation, echo cancellation, filtering, error correction and detection, feature extraction, and pattern matching.

The digital signal processor 10 has a core 12, which is coupled to a Read Only Memory (ROM) 14, a dual-port Random Access Memory (RAM) 16, and an external memory interface 18 over a x and y space address and data buses 20. The core 12 is also coupled to a Parallel input and output (I/O) unit 22, a first and second serial input and output (I/O) unit 24, a timer 26, a bit input and output (I/O) unit 28, and a JTAG unit 30 over an internal databus 32.

The core 12 comprises a data arithmetic unit (DAU) 34, a y-space address arithmetic unit (YAAU) 36, an x-space address arithmetic unit (XAAU) 38, a cache memory 40, and a control block 42. The DAU 34 is the main execution unit for signal processing. It consists of a multiplier, a 36-bit Arithmetic Logic Unit (ALU), and two 36 bit accumulators 50 (shown in FIG. 2). The DAU performs two's complement, fixed point arithmetic and is usable as a multiply/accumulate or ALU structure. Microprocessor-like instructions from an instruction set are executed by the ALU.

The y-space address arithmetic unit 36 supports high-speed, register-indirect, data memory addressing. Using four, 16-bit registers, the y-space address arithmetic unit 36 stores read or write addresses for accessing on-chip and off-chip RAM, via the y space address and data buses 20 and the external memory interface 18.

The x-space address arithmetic unit 38 contains registers and an adder that control the sequencing of instructions read from memory over the x space data and address buses 20, and executed by the core. Memory accessible includes an internal 14 and external ROM, and internal 16 and external RAM.

The cache 40 is coupled to the x and y space data and address bus 20 and the internal data bus 39 via the bridge 44. It stores instructions for repetitive operations to increase the throughput and coding efficiency of the digital signal processor. The cache 40 stores up to 15 instructions at a time and can repeatedly cycle through those instructions up to 127 times, by specifying a iteration amount. This reduces the burden of implementing in-line coding in order to maximize instruction throughput.

The control block 42 is coupled to the x and y space address and data bus and the internal data bus 32 via the bridge 99. It provides overall system coordination. It receives program instructions from the databus 20 and decodes the program instructions. Subsequently, execution of the instructions occurs in the other functional blocks of the digital signal processor.

The bit manipulation unit (BMU) 46 adds additional instructions, to the instruction set of the core 12, that execute in one or two clock periods. The BMU 46 contains logic for barrel shifting, normalization, and bit field insertion and extraction. The BMU 46 also contains a set of 36-bit alternate accumulators that can be shuffled with the main accumulators 50 in the core by transferring data over the internal data bus 32.

The external memory interface 18 provides a 16-bit external address bus, and a 16-bit external, bi-directional data bus. The external address bus and bi-directional data bus are multiplexed between the x-space, and y-space address and data buses 20.

The first and second serial input and output (I/O) units 24 send data to and receive data from devices external to the digital signal processor. Data is sent from and fetched onto the internal databus 32. The serial (I/O) units 24 operate asynchronously and interface with other devices including digital signal processors in a multiple-processor environment and with commercially available codec and time division multiplex channels. The parallel input and output (I/O) interface 22 is used for rapid transfer of data between the internal databus 32 and external devices, such as other digital signal processors, processors, or other peripheral (I/O) devices. A multiplexor 48 selectively couples the parallel I/O interface 22 and the serial I/O interface 24 to external signals.

The bit input and output (I/O) interface unit 28 is coupled to the internal databus 32 and to external devices. It includes an eight bit interface that is intended to communicate status to external devices and is used to control the digital signal processor 10.

The ROM 14 is coupled to the x-space and y-space buses 20 and contains program instructions for performing operations. The RAM 16 is dual port, with separate ports receiving data from and sending output data to the x-space and y-space buses 20.

The timer 26 issues interrupt signals to the core 12 over the internal data bus 32. The JTAG interface 30 is coupled to the internal databus 32 and provides a standard four-pin test access port defined by the IEEE P1149.1 standard document.

Figure 2:
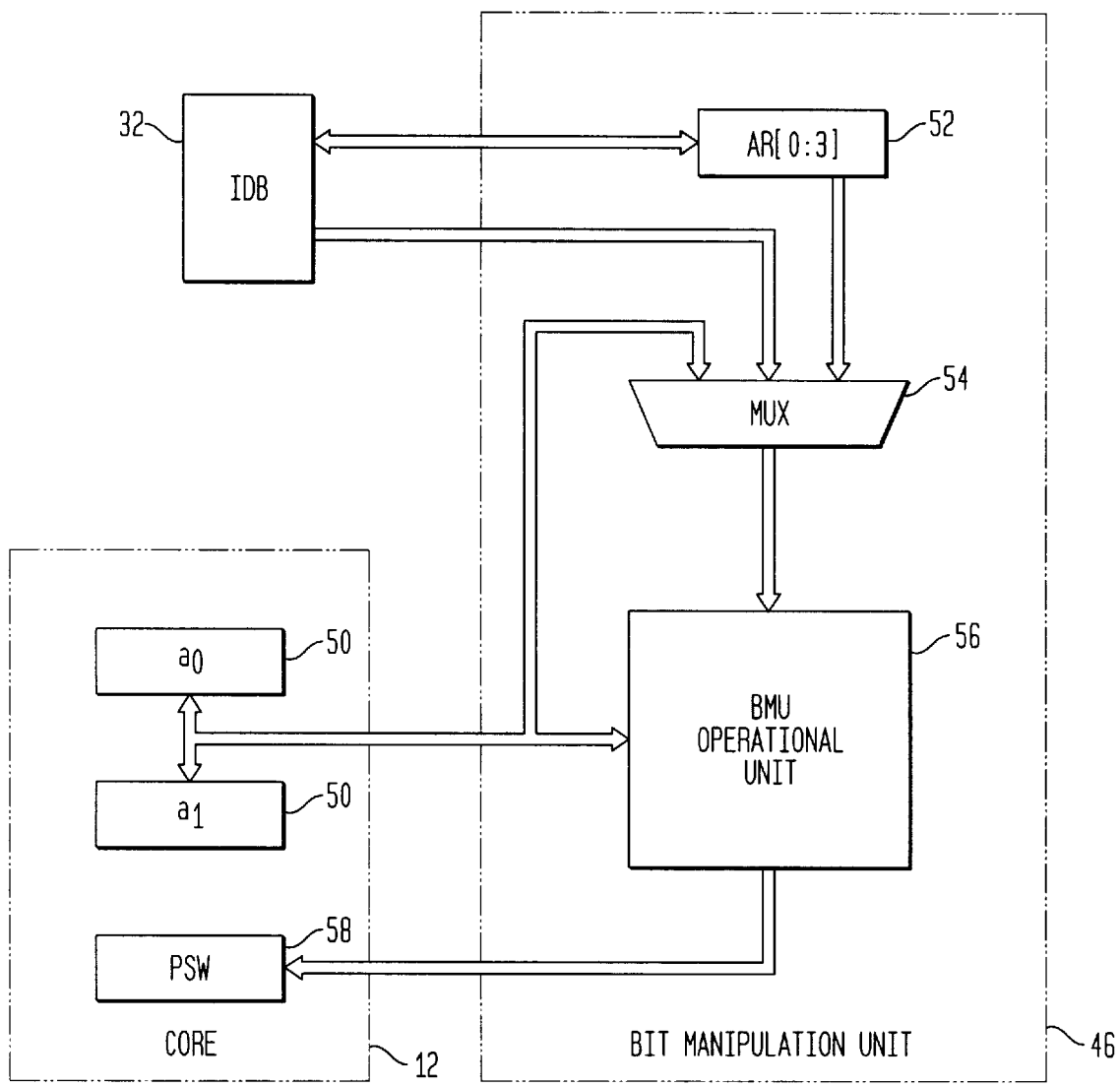
FIG. 2 depicts a block diagram of the bit manipulation unit.

FIG. 2 is a block diagram of the bit manipulation unit (BMU) 46, illustrating an interaction with the main accumulators 50 of the DSP core 12 and the internal databus 32. The BMU 46 comprises registers ar0–ar3 52, a multiplexor 54, a BMU operational unit 56, and alternate accumulators. The BMU operational unit 56 receives an instruction from the multiplexor 54 and input data from the main accumulators 50, and based on the instruction performs arithmetic and logical left and right shifts, normalization, and bit field insertion and extraction on the data received. The instruction determines which type of shifting operation will be performed and the shift amount.

The multiplexor 54, coupled to the BMU operational unit 56, provides instructions to the BMU operational unit for execution. The multiplexor 54 is coupled at its inputs to registers ar0–ar3 52, the internal databus 30, and the main accumulators 50. The multiplexor 54 selects which source of instructions, present at the inputs of the multiplexor 54, to direct to the BMU operational unit 56, based on select line signals received from the DSP core 12. Therefore, the multiplexor 54 sends 16-bit instructions to the BMU operational unit 56 from one of the registers ar0–ar3 52, from the internal databus 32, or from the upper half of one of the main accumulators 50 (bits 31–16).

The registers ar0–ar3 are each 16-bit registers. The registers store instructions which are routed to the BMU operational unit by the multiplexor 54. Furthermore, the registers ar0–ar3 may store an exponent generated by a shift operation in the BMU operational unit 56.

The internal databus 32 is used to load instructions into the BMU operational unit 56, through the multiplexor 54, from any other functional block of the processor 10. For example, test program instructions from external to the digital signal processor 10 could be placed onto the internal databus 32 through the JTAG interface 30. Then, the test program instructions could be loaded into the BMU operational unit 56 for execution through the multiplexor 54.

The main accumulators 50 are 36-bit registers, which store signed two's complement numbers. The main accumulators 50 are part of the core 12, but have bits 16–31 coupled to the multiplexor 54 for supplying instructions to the BMU operational unit 56. Also the main accumulators 50 have all 36-bits coupled to the BMU operational unit 56. Thus, the BMU 46 reads data into the BMU operational unit 56 from a source accumulator within the main accumulators 50, performs a shift operation based on the instructions simultaneously applied to the BMU operational unit 56, and produces a 36-bit operation result (bits 0–35) which is then sent from the BMU operational unit 56 back to a destination accumulator within the main accumulators 50. The above operations must occur within one or two clock periods, depending on the instruction. The BMU operational unit also produces flags indicating the presence or absence of a condition in the operation result.

Each of the flags is output back to a psw register 58 in the DSP core, and each must be captured within the same clock period in which the operation result was captured.

The BMU 46 also includes alternate accumulators which are 36-bit registers. In one clock period, data can be shuffled between a main accumulator 50 and one of the alternate accumulators.

Binary Fixed Point Representation

Shift operations in the BMU operational unit 56 operate on 36-bit numbers represented in binary fixed point form. Binary fixed point representation is a technique for storing positive and negative numbers in a digital computer. Representation can include sign-magnitude representation, signed one's complement representation, and signed two's complement representation. In sign-magnitude representation, typically the left-most bit holds the sign of the number, and the bits to the right of the sign bit indicate the magnitude of the number. Typically, and in the preferred embodiment of the invention, a sign bit of one indicates that the number is negative, and a sign bit of zero indicates that the number is positive.

EXAMPLE 1

$$1101=(-)*1*2^2+0*2^1+1*2^0=-5.$$

Here, a 4-bit number 1101 is shown in sign magnitude representation. The left-most bit is a 1, indicating the number is negative. The remaining three bits indicate the magnitude of the number which, when converted to base 10 as shown, gives a value of negative five.

EXAMPLE 2

$$0101=(+)*1*2^2+0*2^1+1*2^0=5.$$

Here, another four-bit number 0101 is shown in sign magnitude representation. The number has the same magnitude as in example 1, but has a positive sign bit, indicated by a zero in the left-most bit. Thus, when converted to base ten, the number has the value of positive five.

The one's complement representation is used to represent negative numbers. Negative numbers in one's complement representation are obtained by inverting each of the bits in a positive number in sign magnitude representation. Therefore, the number −5 in one's complement representation would be the inverse of 0101, which is 1010.

Two's complement representation is the same as one's complement representation, except that a 1 is added to the one's complement number to get the two's complement number. Therefore, −5 would be 1011 in two's complement representation, which is equal to 1010 in one's complement representation plus 1. Two's complement representation is used in digital computers, because it facilitates arithmetic operations. For example, two two's complement numbers can be added together, including the sign bit, and produce a correct result. When the result of the addition is negative, the sum is still represented in proper signed two's complement representation without any further need for manipulation. When a subtraction needs to be performed, the two's complement of the subtrahend (including the sign bit) is taken and then added to the minuend (including the sign bit) to get the result. Any of the above forms of binary fixed point representation may be used with the present invention. However, two's complement representation is preferred.

Shifting Operations of the BMU

Figure 3:
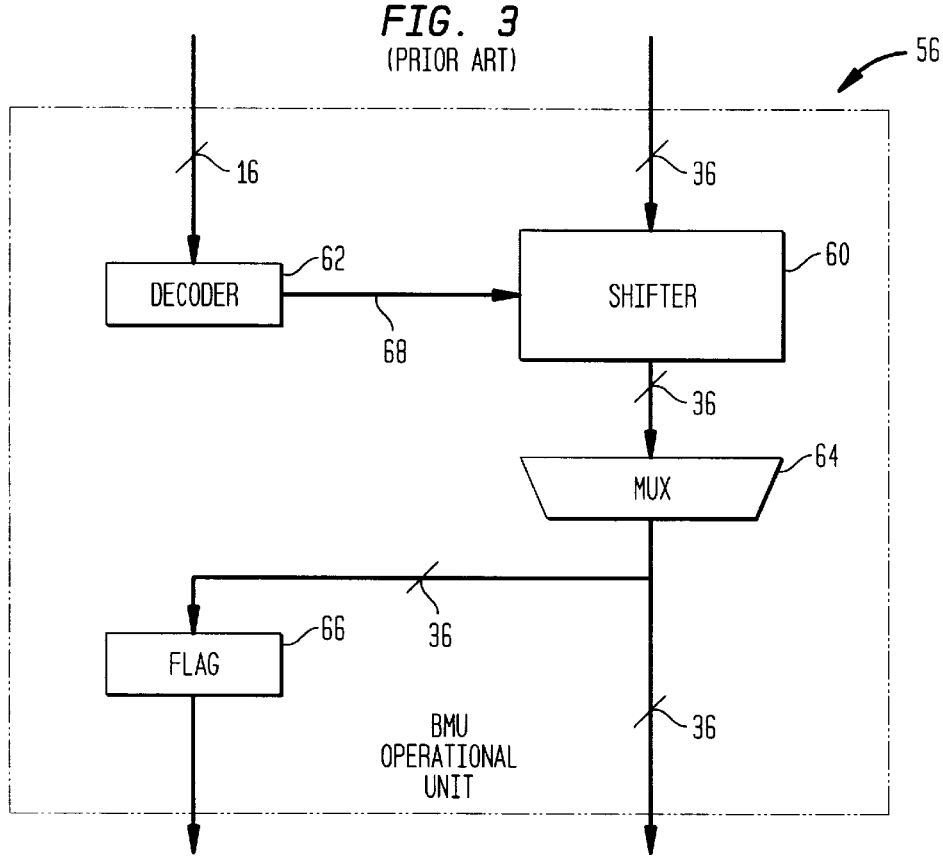
FIG. 3 depicts a BMU operational unit according to the prior art.

FIG. 3 depicts a BMU operational unit 56 according to the prior art. The BMU operational unit 56 includes a 36-bit barrel shifter 60, coupled at its inputs to a decoder 62, 36-bits of input data from the main accumulators, and coupled at its outputs to a multiplexor 64 and a flag generation block 66.

The decoder 62 decodes 16-bit instructions received from the multiplexor 54. The 16-bit instruction designates the type of shift operation to be performed by the barrel shifter 60, and the shift increment. The decoder 62 then issues control signals over line 68 to the barrel shifter 60 to execute the shift operation and produce an operation result.

The barrel shifter 60 receives the control signals from the decoder 62 and input data from the main accumulators 50. Specifically, a source accumulator within the main accumulators 50 is designated by the 16-bit instruction as the source of input data to the barrel shifter 60. The shifter 60 then performs the shift operation specified by the control signals on the input data and produces an operation result. The multiplexor 64 at the output of the barrel shifter 60 selectively applies the operation result from the barrel shifter 60 to registers on the DSP including either a source or destination accumulator within the main accumulators 50.

The BMU performs shifting operations on binary fixed point numbers. Shifting operations include logical left and right shifts, arithmetic left and right shifts, normalization shifts, extraction shifts, and insertion shifts.

Figure 4:
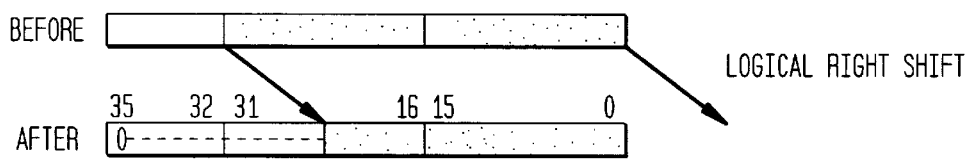
FIG. 4 shows the operation of a logical right shift operation on input data to produce an operation result.
Figure 5:
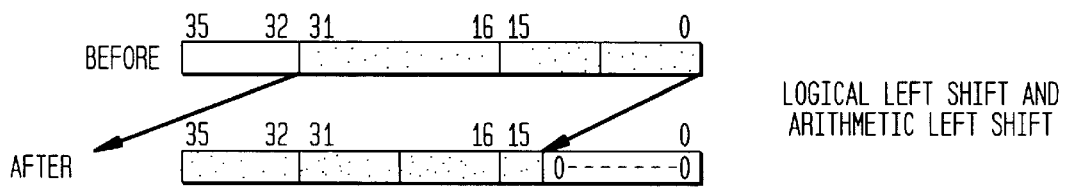
FIG. 5 shows both a logical and arithmetic left shift operation operating on input data to produce an operation result.

In the logical shift, bits are shifted without regard to the sign bit of the number in the shifter. The logical right shift operation is, depicted in FIG. 4. The logical right shift instruction is decoded by the decoder 62, and control signals cause the shifter 60 to shift bits 31–0 to the right by the shift increment specified by the instruction. Bits which become vacant due to the shift operation are filled with zeros. The logical left shift is depicted in FIG. 5. Here, the logical left shift instruction is decoded by the decoder 62, and control signals cause the shifter 60 to shift bits 35–0 to the left by the shift increment specified by the instruction. Bits becoming vacant due to the logical left shift are filled with zeros.

Figure 6:
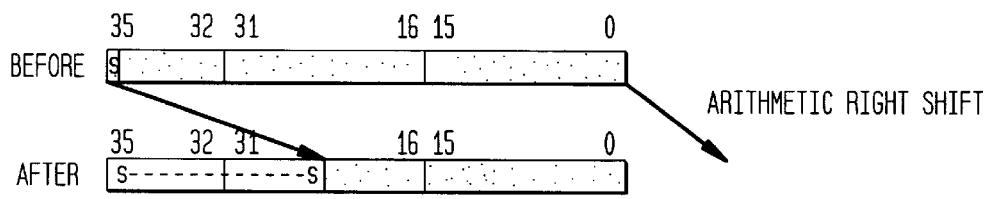
FIG. 6 depicts an arithmetic right shift operation operating on input data to produce an operation result.

Arithmetic shifts take account of the sign bit during shift operations. Therefore, when the sign bit is the left-most bit, the arithmetic left shift operation behaves like logical left-shift operation depicted in FIG. 5. The arithmetic right shift operation is depicted in FIG. 6. First, the arithmetic right shift instruction is decoded by the decoder 62. Then, the control signals cause the shifter 60 to shift the input data to the right by the shift increment. However, rather than fill in the left-most bits of the operation result, vacated during the shift operation, with zeros, the left-most bits of the operation result are filled with the value of the sign bit of the input data. Filling the vacated bits with the sign bit is called sign extending. Sign extending ensures that after the arithmetic right shift operation, the operation result will have the same sign as the input data.

Normalization is a two-step process. One step is to shift the number so that the most significant bit is immediately to the right of the sign bit. Initially, the sign bit will be in bit position 35. Normalization shifts the number so that the sign bit is in bit position 31. The other step is to generate an exponent and store it in one of the ar[0–3] registers 52, which exponent represents the shift increment applied during the shift.

The normalization instruction is decoded by the decoder 62, which sends controls signals to the shifter 60. The shifter 60 operates on the input data, to determine the number of redundant sign bits in the left-most bit positions in the shifter 60. The number of redundant sign bits, K, is the number of continuous bits having the same value starting with bit 35 and moving to the right. The shift increment is then determined by the equation E=K–5. When E is positive, the number should be shifted left E positions to normalize it. When E is negative, the number should be shifted right E positions to normalize it.

EXAMPLE 3

Input Data

| Bits: | 35 | 31 | 0 | |
|---|---|---|---|---|
| (a) | 0000 | 0110001------ | | K = 5, E = 0, no shifting required. |
| (b) | 0000 | 0001100------ | | K = 7, E = 2, shift left twice. |
| (c) | 0000 | 1000000------ | | K = 4, E = –1, shift right once. |
| (d) | 0110 | 1100010------ | | K = 1, E = –4, shift right four times. |
| (e) | 1111 | 1100101------ | | K = 6, E = 1, shift left once. |

In operation (a), the most significant bit, the "1" in bit position 30, is already one position to the right of the sign bit "0" in bit position 31, therefore no shifting operation is required.

In operation (b), the most significant bit is the "1" in bit position 28. Therefore, the number must be shifted left two positions in order to place the most significant bit to the right of the sign bit "0" in bit position 31. The value E, calculated to be 2 for the left shift operation, is an exponent and will be stored in one of the registers ar[0–3] 52 specified in the normalization instruction.

In operation (d), an overflow condition is present in the input data, because the most significant bit is located in the bit field between bits 31 and bits 35. Normalization here requires a right shift of four positions in order to move the most significant bit from bit position 34 to the right of the sign bit "0" in bit 31. The value E, which is –4, will then be stored in a register ar[0–3] specified by the instruction.

The flag block 66 receives the operation result, once produced after exceeding one of the instructions described above, from the barrel shifter 60 via the multiplexor 60. The flag block 66 then generates flag values based on the bits in the operation result. The flag values indicate the presence or absence of a condition in the operation result. The output of the flag block must be stored into the psw register in the core at the end of the same clock period in which the operation result must be stored in a register. For flags which depend on many bits in the operation result, significant delay exists between generation of flag values and production of the operation result. Flags generated include the following:

LEQ—Logical Equal. If all bits 0–35 of the operation result are zero, LEQ is true.

LMV—Mathematical Overflow. LMV is true if any of the bits 31–35 are different after the shift operation.

LLV—Logical Overflow. LLV is true if any significant bits are shifted left out of bit 35.

Parity—Value is added to bring the arithmetic sum of bits to an even number.

Figure 7:
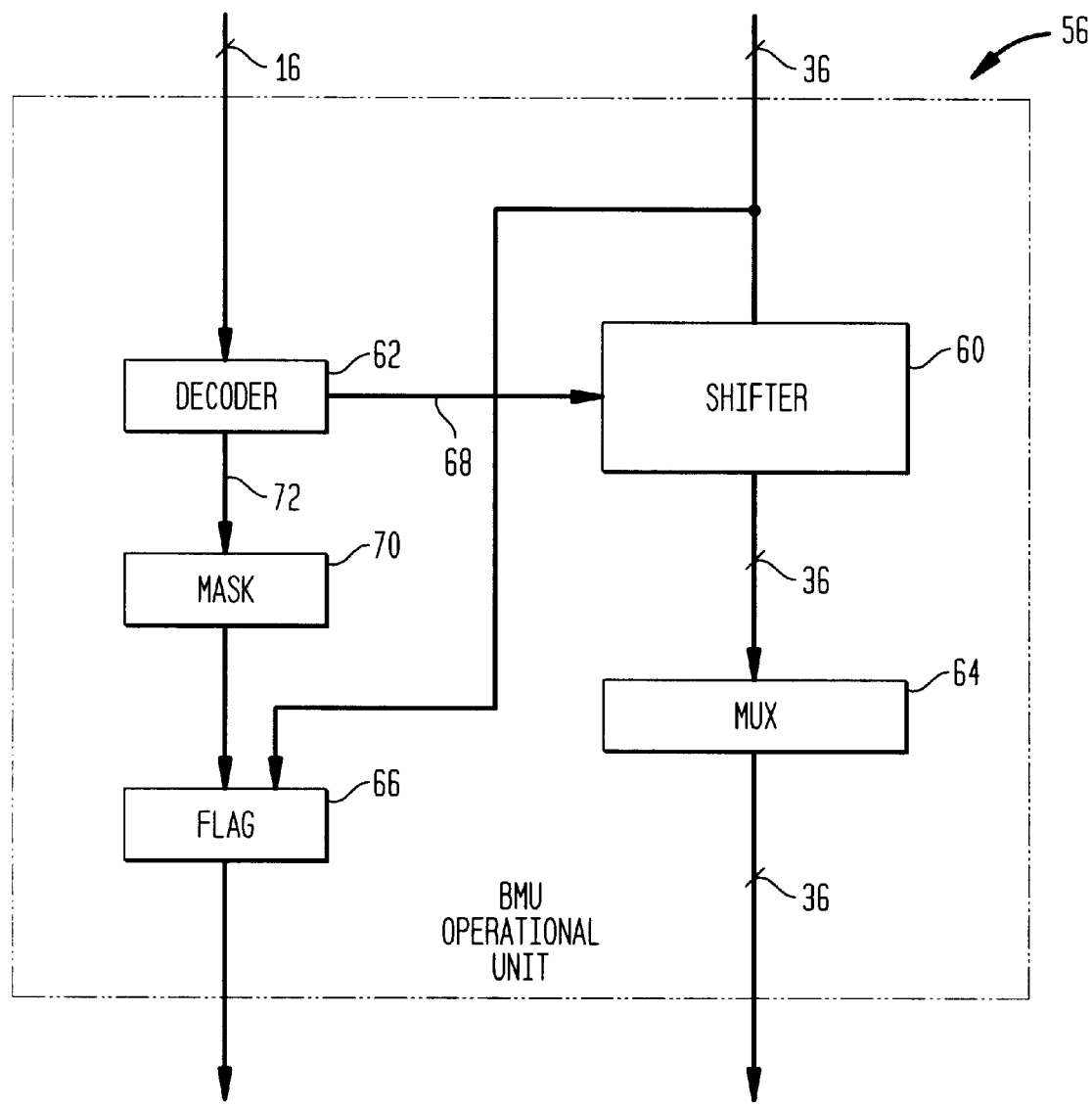
FIG. 7 depicts a BMU operational unit according to an embodiment of the present invention.

FIG. 7 depicts a BMU operational unit 56 according to an embodiment of the present invention. It includes a barrel shifter 60, a decoder 62, and a multiplexor 69 for performing shifting operations and producing an operation result as illustrated in FIG. 3. However, the BMU operational unit according to the present invention also includes a mask block 70, and the flag block 66 is coupled directly to the input data not the output of the shifter 60 via the multiplexor 64. This allows generation of flag values simultaneously with generation of the operation result. The decoder in FIG. 7 is coupled to a source of input instructions and both the shifter and the mask block over control signal line 72. The decoder communicates the type of shift operation and the shift increment to the mask block.

The mask block 70 receives the control signals from the decoder 62, and generates mask data having bits corresponding to the bits in the input data that will remain present, although shifted, in the operation result produced by the barrel shifter 60. The mask data includes a bit string of the same length as the input data, each bit corresponding to one bit of the 36-bit input data. The mask data includes a logic value of "1" for each corresponding bit of the input data that will remain present although shifted in the operation result. Bit positions of the input data that disappear from the operation result by being shifted beyond either the left or right end of the operation result are represented by "0" in a corresponding bit position of the mask data.

The flag block 66 is coupled at its inputs to both the mask block 70 and the data input. It generates flag values, indicating the presence or absence of conditions in the operation result produced by the barrel shifter 60, while the operation result is being generated in the barrel shifter 60. The flag values are generated based on an anticipated operation result, not the operation result itself. The anticipated operation result is generated more quickly than the operation result, allowing the flag values to be generated concurrently with the operation result. The anticipated operation result is generated by logically manipulating the bits of the input data with the bits of the mask data. The anticipated operation result includes bits of the input data that will appear in the operation result, although the bits in the input data are not shifted like the operation result. Flag values are then generated from the operation result, and are output to the psw register 58 in the processor core.

Figure 8:
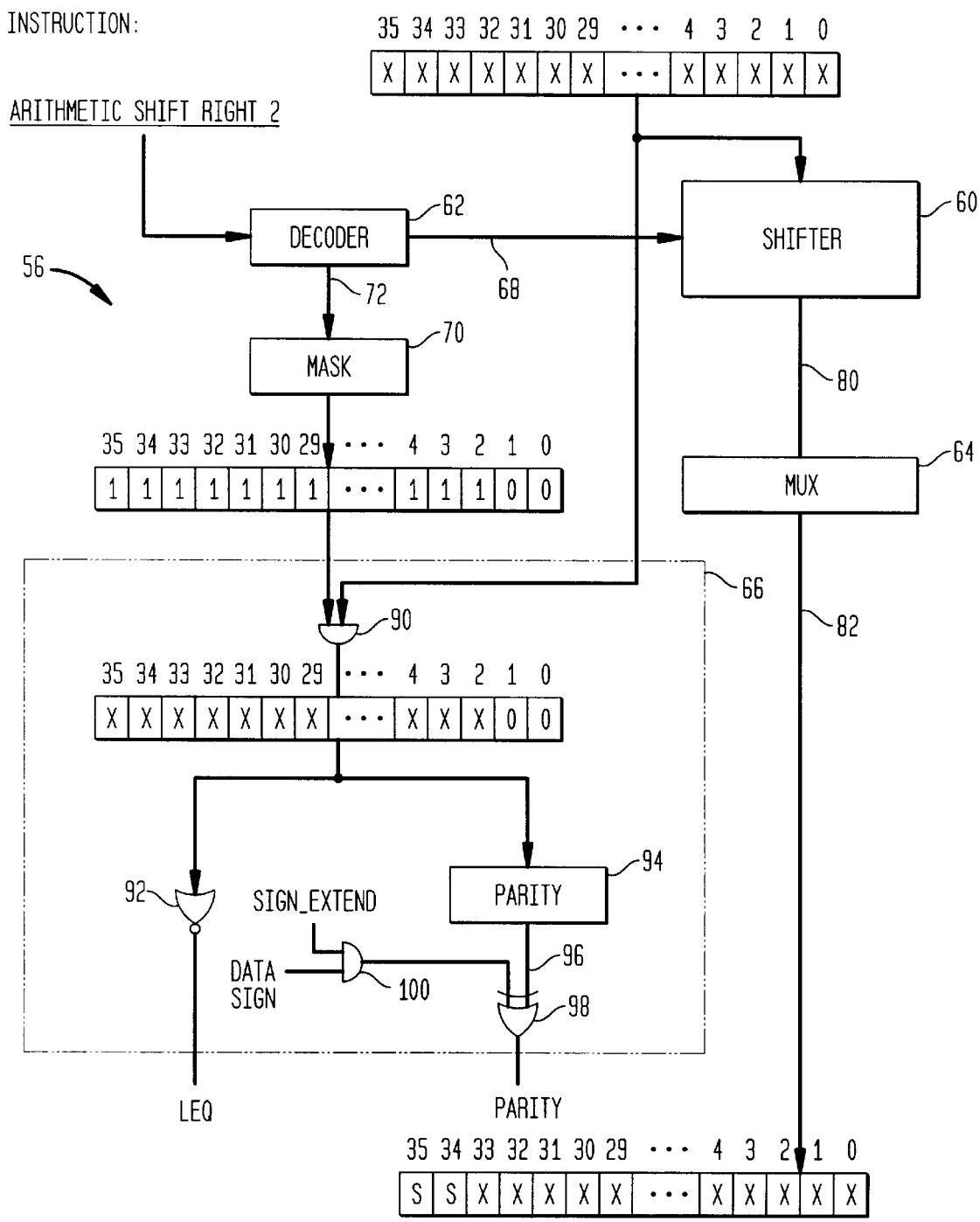
FIG. 8 depicts an embodiment of the BMU operational unit illustrating the generation of the LEQ and Parity flag values for an arithmetic right shift operation.

FIG. 8 depicts an embodiment of a BMU operational unit 56, illustrating the logic present in the flag block. FIG. 8 also illustrates the generation of mask data, an anticipated operation result, LEQ and Parity flags, and the operation result itself based on input data and an instruction.

The data input to the BMU operation result has 36 bits (0–35) and is in signed two's complement representation. Bit 31 holds the sign bit, and bits 35–32 are guard bits used to prevent the loss of bits as a result of an arithmetic or shift operation that produces a carry in either the core 12 or the BMU 46. The input data is coupled to both the shifter 60 and the flag block 66.

An instruction, in this case an arithmetic shift right 2 positions instruction, is coupled into the decoder 62. The instruction causes control signals 68 and 72 to be sent to the shifter 60 and the mask block 70 respectively indicating the type shift instruction and the shift increment. The shifter 60 shifts the input data and produces a 36-bit operation result on line 80. The operation result is then coupled to line 82 by the multiplexor 64. The operation result contains the shifted input data, with sign extension in the left-most bits as shown and designated by an "s". The mask block 70 receives the control signals and produces mask data. The right-most two bits of the mask data are filled with zeros, because these two bits will be lost when the input data is shifted to the right. The remaining 34 bits will be present in the operation result, and each corresponding bit of the mask data is therefore are filled with the value "1".

The mask data and the input data enter the flag block 66 for logical manipulation to produce an anticipated output result. In the case of the Parity and LEQ flag generation, logical manipulation includes performing a logical "AND" 90 of each bit of the input data with a corresponding bit of the mask data. This produces a 36-bit anticipated operation result. The anticipated operation result contains the same bits as the input data, except that bits of the input data, corresponding to the bits of the mask data containing a "0", become "0" as shown in FIG. 8.

In the case of the LEQ flag, the anticipated operation result is input to a 36 input NOR gate 92. If all 36-bits of the anticipated operation result are "0", the NOR gate 92 output will produce a flag value of "1". This indicates the LEQ flag is true and that all 36 bits of the operation result are zero. Otherwise, if all 36 bits of the anticipated output result are not zero, the LEQ flag value will be a "0" indicating a false condition.

In the case of the Parity flag, the anticipated output result is input into a parity block 94. Parity block 94 implementations are well known and may consist of cascaded XOR logic blocks which detect whether the sum of the bits input to the parity block 94 is even or odd. Once the parity of the operation result has been produced by the Parity block 94 on line 96, the result is fed into an XOR gate 98 with the output of a 2-input AND gate 100. Sign_extend and the sign of the data are inputs to the AND gate 100 and affect the ultimate value of the Parity flag. The output of the XOR gate 98 is the PARITY flag value.

Figure 9:
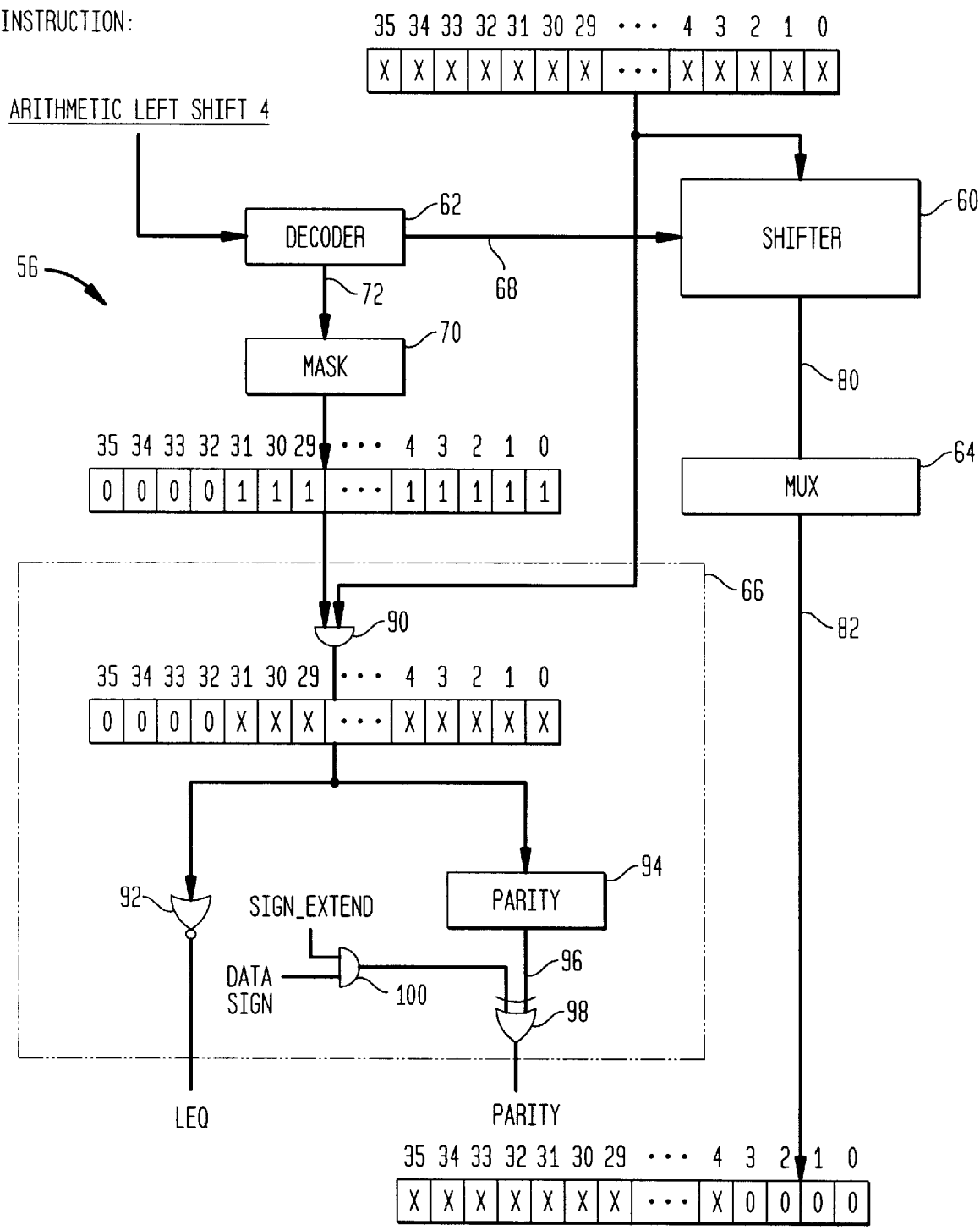
FIG. 9 depicts an embodiment of the BMU operational unit illustrating the generation of the LEQ and Parity flag values for an arithmetic left shift operation.

FIG. 9 depicts the same embodiment of the invention as depicted in FIG. 8, wherein the instruction is an arithmetic left shift 4 positions. This instruction causes, via control signals 72 from the decoder 62, the mask block 70 to produce zeros in the four left-most bits of the mask data. The zeros represent bits of the input data that will be lost when the input data is shifted four positions to the left. The remaining 32 bits of the mask data contain the value of "1" as shown.

In the flag block 66, the logical AND 90 of the mask data and the input data results in an anticipated operation result with four zeros in the left-most bit positions. The remaining 32 bits contain the value of the corresponding input data bits, indicated by the value x as shown.

The LEQ and Parity flag logic operates on the anticipated operation result for the arithmetic left shift operation as described for the arithmetic right shift operation of FIG. 8.

The operation result produced by the arithmetic left shift 4 positions instruction contains the bits of the input data shifted to the left four bit positions, with the right-most four bits being filled with the value "0", and the remaining four bits being shifted left as shown in FIG. 9.

Figure 10:
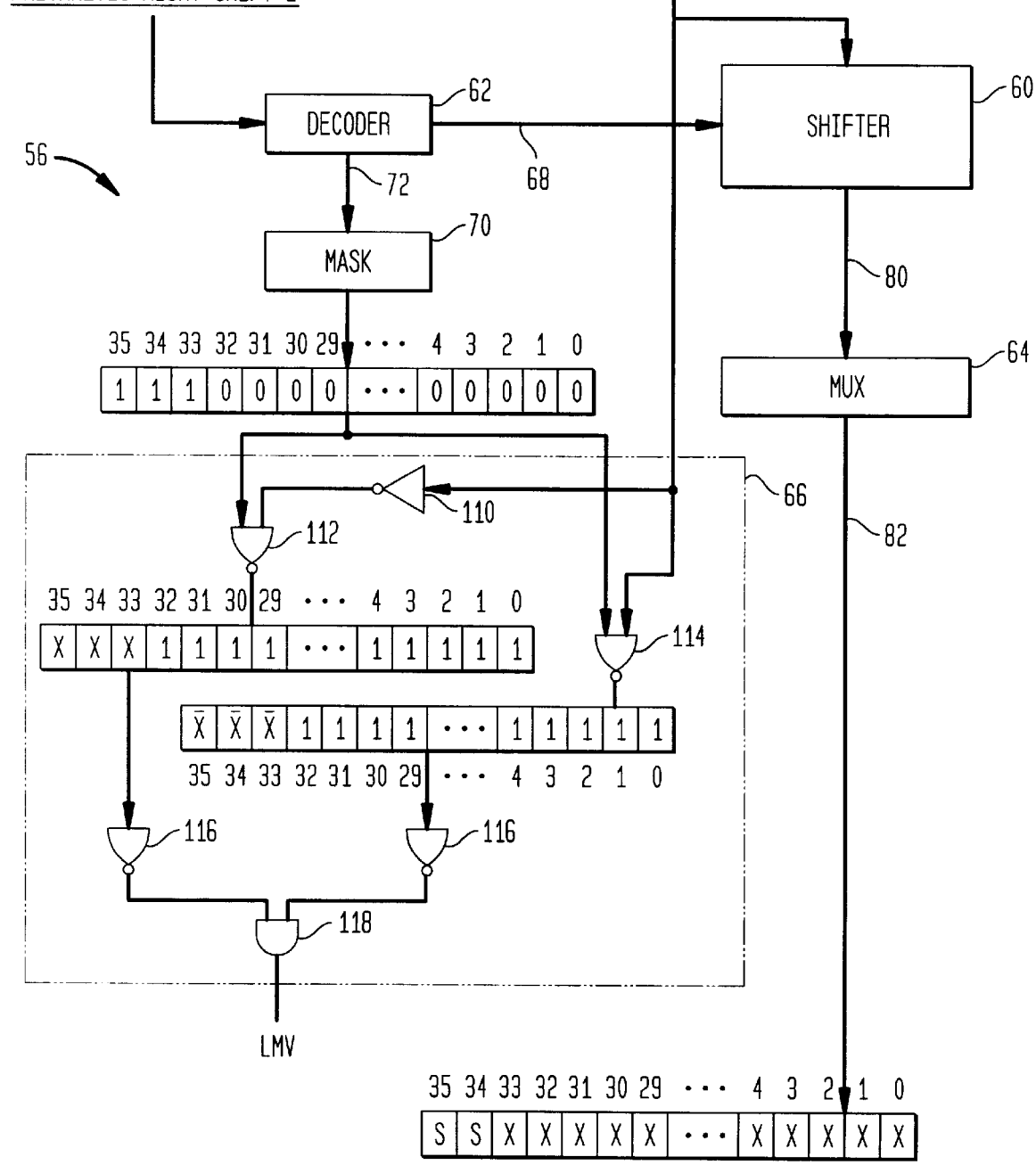
FIG. 10 depicts an embodiment of the present invention for generating the LMV flag in response to an arithmetic shift right instruction.

FIG. 10 depicts an embodiment of the present invention for generating the LMV flag. The LMV flag is true if any of the guard bits (32–35) of the operation result contain data that is not a sign bit. Thus, if all of the guard bits and the sign bit 31 are either "1" or "0", then the guard bits contain simply the sign of the number, sign extended from bit 31. If any of the bits 31–35 are different relative to each other, then significant digits are present in the guard bits, and a math overflow has occurred which is indicated by a "1" or "True" condition in the LMV flag.

The arithmetic right shift 2 bit positions instruction is used in FIG. 10 to illustrate the cooperation between the mask block 70 and the flag block 66. In response to this instruction, the mask block 70 produces data having all zeros in bit positions 0–30. In bit positions 31–35, a value "0" is placed in each position, beginning with bit position 31, corresponding to the right shift increment. For a right shift of 2, two zeros are placed in the mask data, one at bit position 31 and the other at bit position 32 because these bits will be shifted into bits 0–30 after the shift operation. The remaining guard bits 33–35 are filled with the value 1, because they will remain present, after the shift operation, in the guard bit and sign bit fields.

In the flag block 66 two anticipated operation results are produced. One anticipated operation result is produced by inverting the input data with an inventor 110 and then taking the logical NAND of the inverted input data and the mask data with NAND gate 112. This produces inverted input bits in bit positions 35–33 indicated by "x bar" in these positions. The remaining bit positions contain the value "1". A second anticipated operation result is generated by taking the logical NAND of the input data and the mask data with NAND gate 114. This produces an anticipated operation result with the input data in bit positions 35–33 and ones in the remaining bits as shown.

The LMV flag value is then generated by taking the logical NAND of each of the 36 bits of the anticipated result, with two 36 input NAND gates 116, and feeding the output of the NAND gates to a logical AND gate 118. The logical NAND gates 116 detect if either of the anticipated operation results contains all ones. If so, the value "0" is produced by that 36 bit NAND gate 116 and the LMV flag is given the value of "0" by the AND gate 118. A LMV value of "0" indicates that all of the bits of the operation result in bit positions 31–35 are either all zero or all one, therefore indicating that no significant digits are in the guard bits. Conversely, if any of the bits in bit positions 31–35 contain values different with respect to each other, neither NAND gate 116 will produce a "0", and therefore the output of the AND gate 118 will be a "1". A value of "1" for the LMV flag indicates that there are significant bits in the guard bits, and therefore that a math overflow has occurred.

Figure 11:
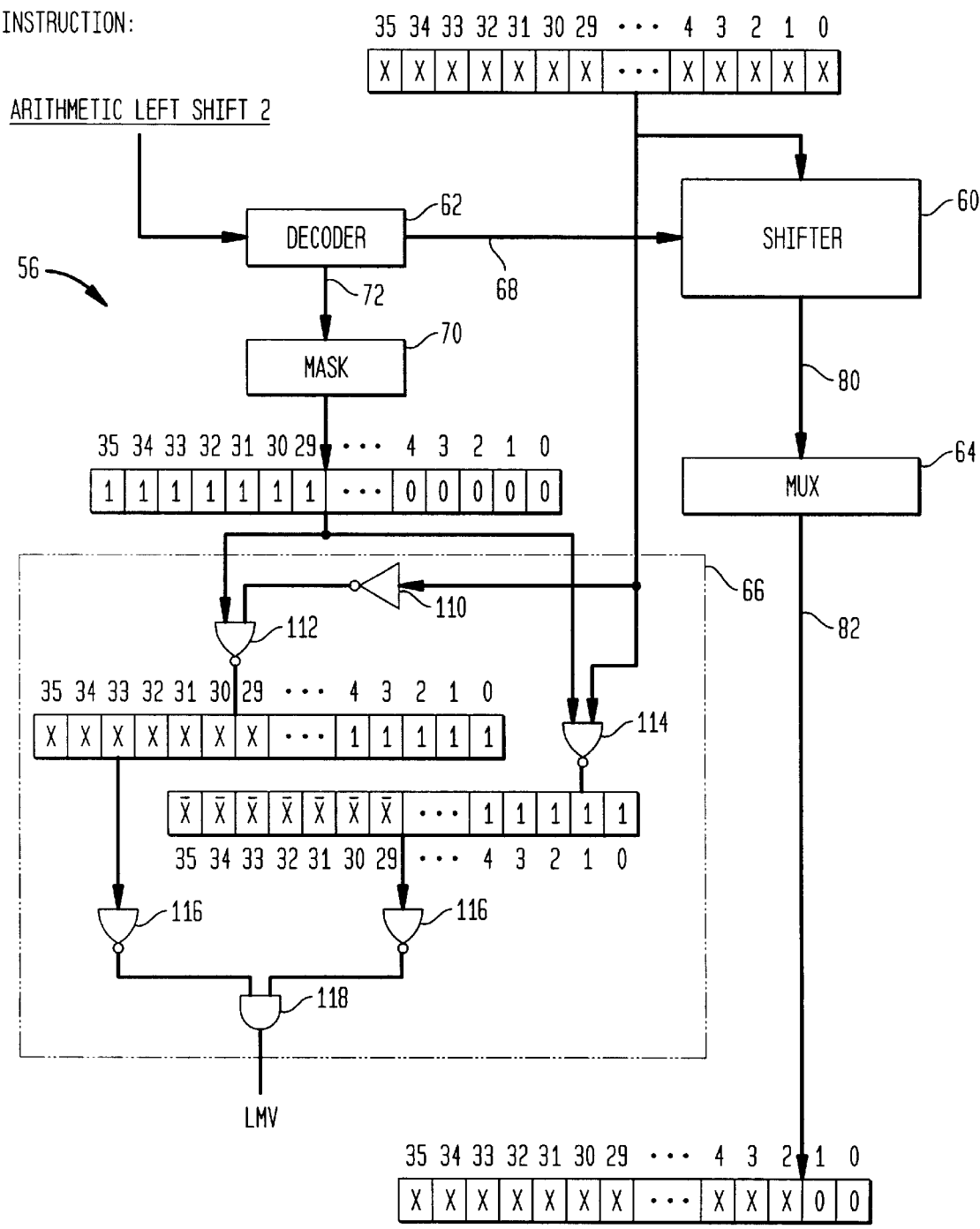
FIG. 11 depicts an embodiment of the present invention for generating the LMV flag in response to an arithmetic shift left instruction.

FIG. 11 shows mask data produced for an arithmetic left shift 2 positions instruction used to generate the LMV flag. Here, the mask data contains a field of ones, the width of which is equal to the number of guard bits plus one for the sign bit plus the left shift increment. Here, the left shift increment is two, therefore the field of ones extends two bit positions to the right of the sign bit in position 31. It will be understood that if more guard bits are present, the field of ones will correspondingly increase in width.

The same logic is present in the flag block 66 of FIG. 11 for generating the LMV flag as was present in the flag block 66 of FIG. 10. Here, one anticipated operation result contains inverted input data bits in bit positions defined by the field of ones in the mask data. A second anticipated operation result contains the input data bits, without inversion, corresponding to the locations defined by the field of ones in the mask data. If either anticipated operation result contains all ones, one of the NAND gates 116 will produce the value "0" indicating that the guard bits and the sign bit in the operation result are all the same. Thus, no significant bits are located in the guard bits of the operation result and the AND gate 118 will produce a "0" for the LMV flag. Conversely, if neither anticipated operation result contains all ones, then significant bits are present in the guard bits of the operation result, and the AND gate 118 will produce a "1" indicating that LMV is true and a math overflow has occurred.

Figure 12:
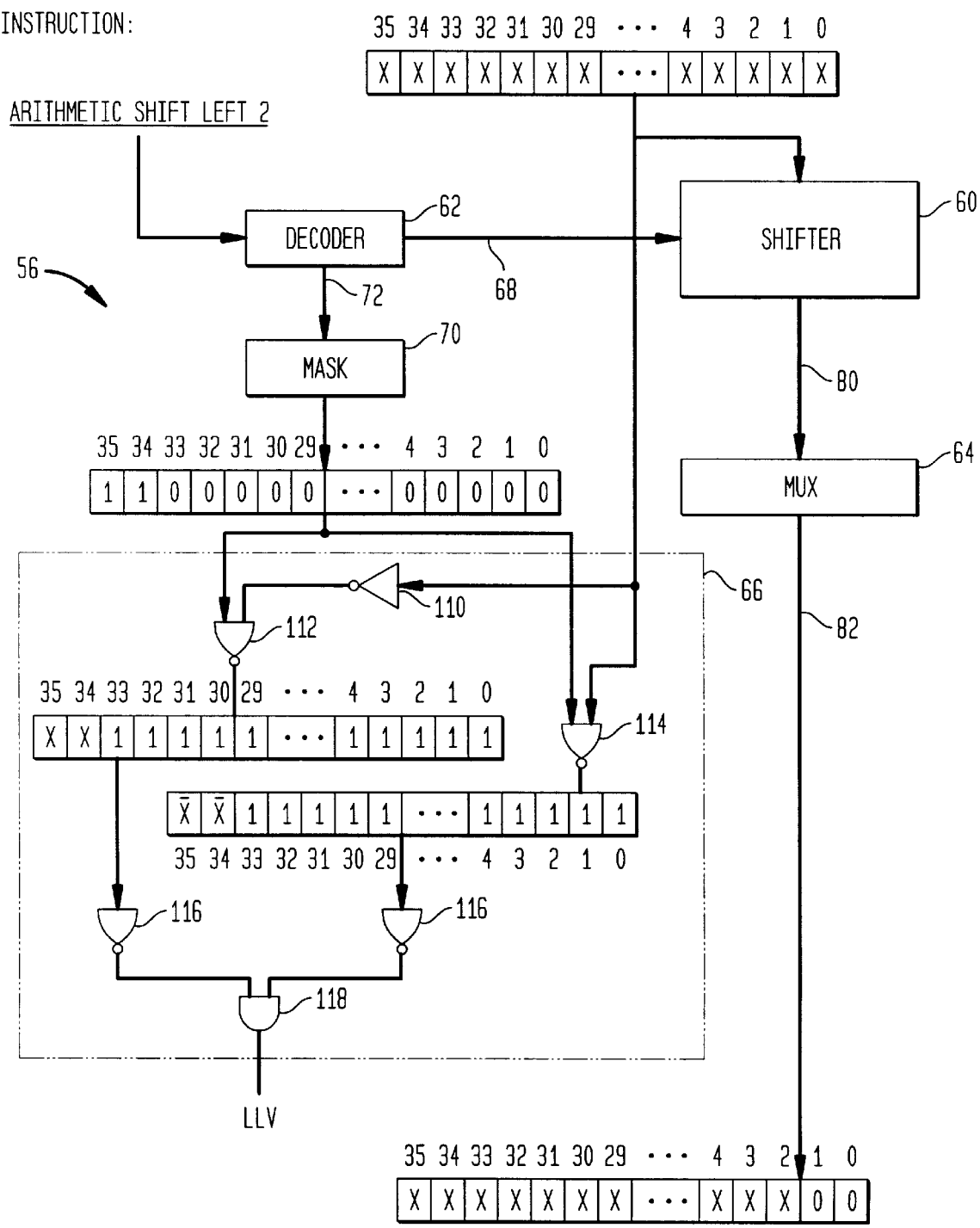
FIG. 12 depicts an embodiment of the present invention for generating the LLV flag in response to an arithmetic shift left instruction.

FIG. 12 shows mask data produced for an arithmetic left shift 2 positions instruction used to generate the LLV flag. Here, the mask data contains a field of ones beginning at bit position 35, the width of which is equal to 1 plus the left shift increment. The left shift increment is two, therefore the field of ones extends two bit positions to the right of bit position 35.

The same logic is present in the flag block 66 of FIG. 11 for generating the LLV flag as was present in the flag block 66 of FIGS. 10 and 11. One anticipated operation result contains inverted input data bits in bit positions defined by the field of ones in the mask data. A second anticipated operation result contains the input data bits, without inversion, corresponding to the locations defined by the field of ones in the mask data. If either anticipated operation result contains all ones, one of the NAND gates 116 will produce the value "0" indicating that no significant bits will be shifted left of bit 35. Thus, the AND gate 118 will produce a "0" for the LLV flag indicating that the condition is false. Conversely, if neither anticipated operation result contains all ones, then significant bits are present in the guard bits of the operation result, and the AND gate 118 will produce a "1" indicating that LLV is true and a logical overflow has occurred.

Figure 13:
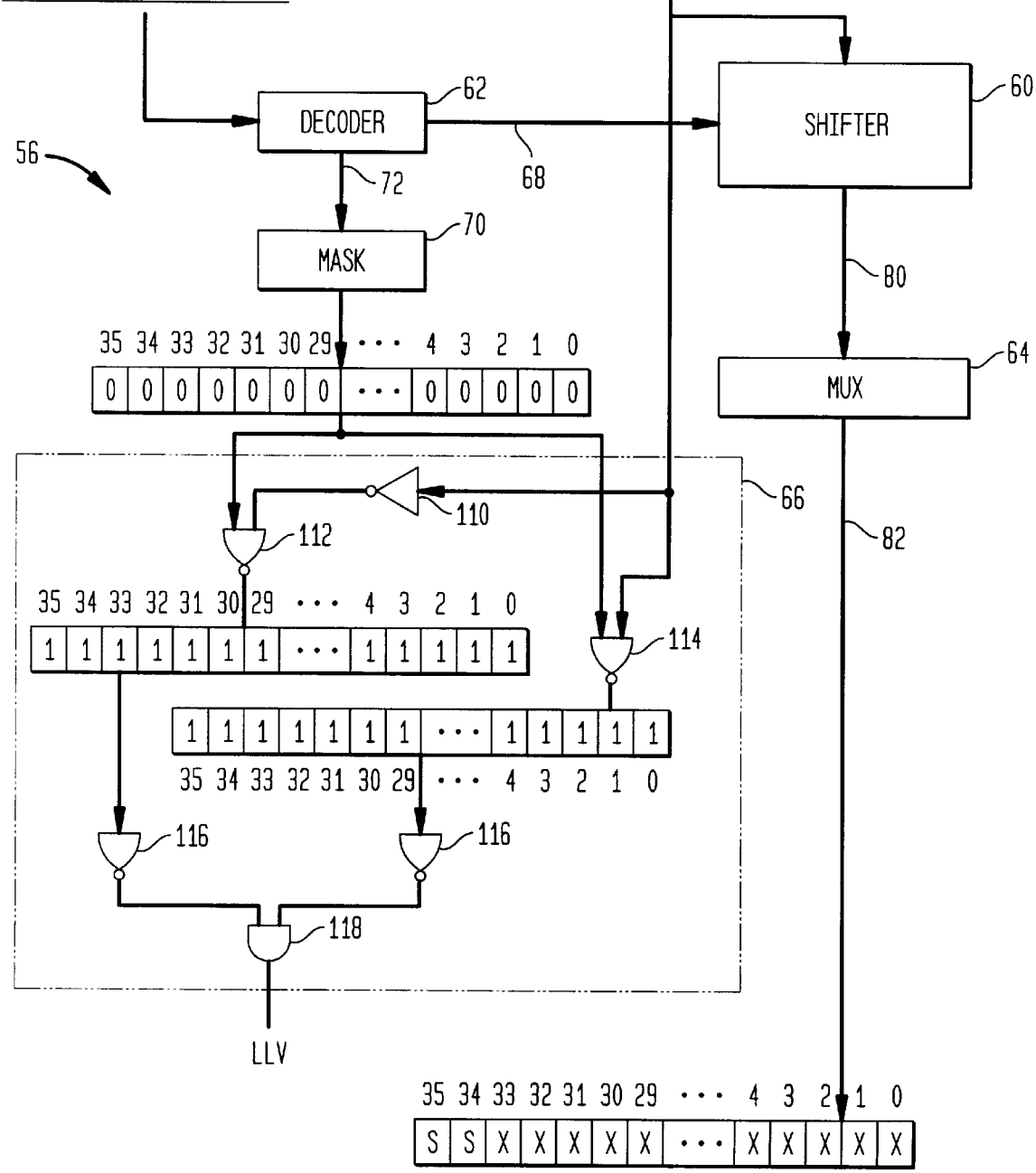
FIG. 13 depicts an embodiment of the present invention for generating the LLV flag in response to an arithmetic shift right instruction.

FIG. 13 shows mask data produced for an arithmetic right shift 2 positions instruction used to generate the LLV flag. Here, the mask data contains all zeros because none of the bits in bit positions will be shifted to the left and, therefore, a logical overflow condition cannot occur.

The same logic is present in the flag block 66 of FIG. 11 for generating the LLV flag as was present in the flag block 66 of FIGS. 10 and 11. Both anticipated operation results contain all ones. Consequently, both of the NAND gates 116 will produce the value "1" indicating that the bits shifted out of the operation result are all the same. Thus, no significant bits are shifted out of bit 35 the AND gate 118 will produce a "0" for the LLV flag indicating that no logical overflow has occurred.

In an embodiment of the invention for generation of flags based on the normalization instruction, the input data is coupled to the decoder 62 in addition to the flag block 66. The decoder 62 decodes the normalization instruction and includes a leading digit detector circuit, which calculates the value E or the shift increment based on the input data as shown and described in Example 3. The mask data is then generated as described for the arithmetic left shift and right shift instructions, where the direction of shift is based on the sign of E, and the shift increment is based on the absolute value of E. Based on the mask data and the input data, the flag block 66 generates the LEQ, Parity, LMV, and LLV flags as previously shown and described in FIGS. 8–13. The value of LMV and LLV will always be zero for a normalization instruction because normalization by definition retains upper significant bits and shifts them out of the guard bits when necessary. Therefore, the decoder 62 could output mask data of all ones to the flag block 66, upon receiving a normalization instruction, for generation of the LMV and LLV flags. Alternatively, the decoder 62 could output a separate signal to the flag block 66 indicating that a normalization instruction is being processed and that the LMV and LLV flags should be set to the false condition.

Figure 14:
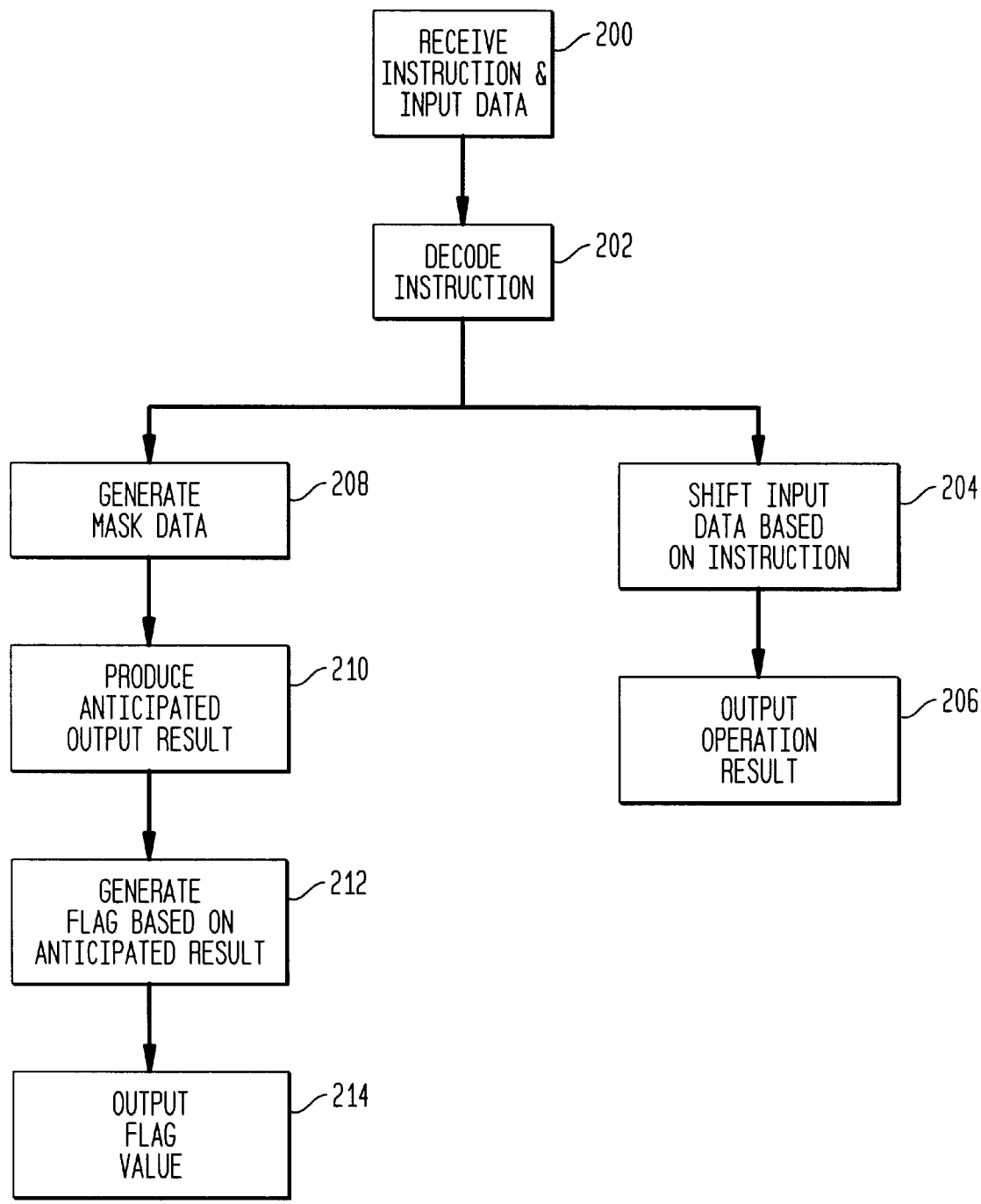
FIG. 14 depicts a method of generating flag values in accordance with an embodiment of the present invention.

FIG. 14 depicts a method according to a preferred embodiment of the present invention. In step 200, an instruction and input data is received by an operational unit. Subsequently, in step 202, the instruction is decoded. Then, in step 204, the data is shifted in based on the type of instruction and the shift increment as determined in the instruction decoding step. Alternatively, any type of operation may be performed here by the operational unit, other than shifting, so long as each bit in the operation result generated depends on a single bit from the input data. In step 206, the operation result from the operation performed in step 204 is output.

While the data is being shifted in step 209, the operational unit generates mask data in step 208 based on the decoded instruction. Subsequently, an anticipated output result or results is or are produced by logically manipulating the input data with the mask data in step 210. Then, in step 212, a flag value is generated, based on the anticipated operation result, indicating the presence or absence of a condition in the operation result generated in step 204. The flag value is then output in step 214. In an alternate embodiment of the invention, the operational unit only performs one predesignated function. In this scenario, no instruction to the operational unit is required, and the operation result is generated from the input data in a predetermined manner. The mask data is always the same, since the function performed does not change, and the anticipated operation result is produced from the input data and the mask data.

While an embodiment of the present invention has been presented, it will be understood by those having ordinary skill in the art that changes can be made without departing from the spirit and scope of the invention. For example, while 36-bit numbers in signed two's complement representation were chosen and are a preferred embodiment, any arbitrary bit length numbers could be used in any other form of representation including sign magnitude, one's complement representation, binary coded decimal, and floating point representation. Furthermore, the number of guard bits within the bits of the number can be any number depending on the specific requirements of the implementation. In another preferred embodiment of the invention, 40 bit numbers in signed two's complement representation are used.

The mask block, the flag block and the processor itself can be implemented using many techniques, including discrete logic, integrated circuit logic using technologies including Bi-polar, CMOS, NMOS, and PMOS technologies, field programmable gate arrays (FPGA), and programmable logic arrays (PLA). The mask block as described places the value "0" in bit positions of the mask data corresponding to input data bit positions that will be shifted out of the operation result. However, the value "1" could be placed in these bit positions and the same result achieved through variations of the logic presented consistent with DeMorgan's theorem and other widely understood principles.

What is claimed is:

1. A method for generating a flag in parallel with a production of an operation result by an operational unit, the flag and the operation result being generated based on an instruction and data input to the operational unit and the flag indicating a condition present in the operation result of the operational unit, comprising the steps of:

producing mask data based on the instruction input to the operational unit;

determining an anticipated operation based on the mask data and the data input to the operational unit result, without affecting production of the operation result; and generating a parity flag based on the anticipated operation result, without using the operation result.

2. The method according to claim 1, wherein the generating step further comprises generating a flag indicating that the operation result comprises all zeros.

3. The method according to claim 1, wherein the generating step further comprises generating a flag indicating that the operation result has a mathematical overflow.

4. The method according to claim 1, wherein the data input to the operational unit includes a signed integer.

5. The method according to claim 4, wherein the signed integer is represented in signed two's complement representation.

6. The method according to claim 4, wherein the signed integer is represented in signed one's complement representation.

7. The method according to claim 4, wherein the signed integer is represented in sign magnitude representation.

8. The method according to claim 4, wherein the data input has 36 bits, the 36 bits including 4 guard bits.

9. The method according to claim 4, wherein the data input has 40 bits, the 40 bits including 8 guard bits.

10. The method according to claim 4, wherein the operational unit is a barrel shifter and performs left and right shift operations on the signed integer, based on the instruction.

11. The method according to claim 10, wherein the barrel shifter normalizes the output data by performing the left and the right shift operations.

12. A method for generating a plurality of flags indicating conditions present in an operation result and in parallel producing the operation result in an operational unit based on data input to the operational unit, comprising the steps of:

producing mask data;

determining an anticipated operation result based on the mask data and the data input to the operational unit, without affecting production of the operation result; and generating a plurality of flags, including a parity flag, based on the anticipated operation result, without using the operation result.

13. The method according to claim 12, wherein the data input to the operational unit includes a signed integer.

14. The method according to claim 13, wherein the signed integer is represented in signed two's complement representation.

15. The method according to claim 13, wherein the signed integer is represented in signed one's complement representation.

16. The method according to claim 13, wherein the signed integer is represented in sign magnitude representation.

17. The method according to claim 13, wherein the operational unit is a barrel shifter and performs left and right shift operations on the signed integer, based on the instruction.

18. An integrated circuit generating a flag indicating a condition present in an operation result, produced by an operational unit, based on input data and an instruction issued to the operational unit, comprising:

a decoder, connectable to source of an instruction for the operational unit, generating control signals based on the instruction;

a mask block, coupled to the control signals of the decoder, generating mask data based on the control signals; and a flag block, coupled to the mask block, having an input connectable to a source of input data for the operational unit, the flag block generating a flag value, including a parity flag, based on the mask data and the input data, without using the operation result, and the flag value corresponding to a condition present in the operation result of the operational unit.

19. The apparatus according to claim 18, wherein:

the flag block generates an anticipated output result based on the mask data and the input data; and flag logic is coupled to the anticipated result for generating the flag value.

20. The apparatus according to claim 19, wherein the anticipated output result is generated by taking the logical AND of the mask data and the input data.

21. The apparatus according to claim 19, wherein the flag logic includes taking the logical OR of the anticipated output result.

* * * * *